United States Patent [19]

Atsuumi et al.

[11] Patent Number: 5,408,095
[45] Date of Patent: Apr. 18, 1995

[54] OPTICAL SCANNER HAVING AN IMAGE FORMING MIRROR AND MEANS FOR REDUCING SCANNING LINE PITCH IRREGULARITIES

[75] Inventors: Hiromichi Atsuumi, Yokohama; Nobuo Sakuma, Inagi; Osamu Endou, Kawasaki, all of Japan

[73] Assignee: Ricoh Company, Ltd., Tokyo, Japan

[21] Appl. No.: 94,793

[22] Filed: Jul. 21, 1993

[30] Foreign Application Priority Data

Jul. 22, 1992 [JP] Japan .................. 4-195339
Aug. 28, 1992 [JP] Japan .................. 4-230252
Feb. 5, 1993 [JP] Japan .................. 5-018956

[51] Int. Cl.$^6$ ........................... G02B 26/10
[52] U.S. Cl. ................. 250/236; 359/208
[58] Field of Search .......... 250/234, 235, 236; 358/494, 480, 481; 359/196, 205, 206, 208, 213, 214, 215, 216, 217, 221, 869

[56] References Cited

U.S. PATENT DOCUMENTS

| | | | |
|---|---|---|---|
| 4,984,858 | 1/1991 | Kuroda | 359/208 |
| 5,157,534 | 10/1992 | Endou et al. | 359/212 |
| 5,170,278 | 12/1992 | Wada et al. | 359/212 |
| 5,220,449 | 6/1993 | Kuroda | 359/208 |
| 5,233,454 | 8/1993 | Sakuma et al. | 359/196 |

Primary Examiner—David C. Nelms
Assistant Examiner—John R. Lee
Attorney, Agent, or Firm—Oblon, Spivak, McClelland, Maier & Neustadt

[57] ABSTRACT

In an optical scanner, a light source emits a light beam and a coupling lens changes this light beam to a convergent, divergent or parallel light beam. An optical deflector deflects the light beam from the coupling lens at an equal angular velocity. The deflected light beam is converged onto a scanned face by an image forming mirror and an elongated cylindrical optical element to perform an optical scanning operation at an equal speed. An optical path separating device separates an optical path of light reflected on the image forming mirror from an optical path of incident light from the light source to the image forming mirror. A reflecting face of the image forming mirror is constructed by a coaxial aspherical surface. The elongated cylindrical optical element has positive refracting power only in a direction perpendicular to a longitudinal direction thereof and is arranged between the image forming mirror and the scanned face in a state in which this longitudinal direction is parallel to a main scan-corresponding direction. In this optical scanner, a change in diameter of a light spot caused by field curvature is effectively reduced.

12 Claims, 12 Drawing Sheets

−4.000    4.000(mm)

−1.000    1.000(%)

−0.050    0.050(mm)

-4.000   4.000(mm) -1.000   1.000(%)

-4.000  4.000(mm)  -1.000  1.000(%)

-4.000  4.000(mm)  -1.000  1.000(%)

CURVE IN SCANNING LINE

OPTICAL SCANNER HAVING AN IMAGE FORMING MIRROR AND MEANS FOR REDUCING SCANNING LINE PITCH IRREGULARITIES

BACKGROUND OF THE INVENTION

1. Field of the Invention

The present invention relates to an optical scanner.

2. Description of the Related Art

In various kinds of general known optical scanners relative to an optical printer, etc., a light beam deflected at an equal angular velocity is converged as a light spot on a scanned face to scan the scanned face. An $f\theta$ lens is generally known as an optical system for converging the deflected light beam as the light spot on the scanned face. However, an image forming mirror having a linearity correcting function is recently used instead of the $f\theta$ lens as a proposal. For example, such a proposal is shown in Japanese Patent Application Laying Open (KOKAI) No. 1-200221.

In a recent optical scanner, a high density record is required to improve the quality of a written image. To do this, it is necessary that no diameter of a light spot for scanning the scanned face is greatly changed as the height of an image is increased. The diameter of the light spot is influenced by loci of an image forming point in a main scan-corresponding direction and a cross scan-corresponding direction, i.e., field curvatures in these directions in an image forming system for converging the deflected light as a light spot. The main scan-corresponding direction is set to a direction corresponding and parallel to a main scanning direction on a virtual optical path on which an optical path from a light source to the scanned face is linearly developed. The cross scan-corresponding direction is set to a direction corresponding and parallel to a cross scanning direction on this virtual optical path.

It is sufficient to set the field curvatures of the image forming system to zero in both the main scan-corresponding direction and the cross scan-corresponding direction so as to restrain the change in diameter of the light spot. However, it is practically impossible to set the field curvatures of the image forming system to zero. In reality, the field curvatures are considerably caused in the main scan-corresponding direction and the cross scan-corresponding direction. The change in diameter of the light spot caused by the field curvature in the main scan-corresponding direction can be corrected by electrically controlling a time for writing one dot to such an extent that no practical problems about this change are caused. In contrast to this, it is difficult to make such an electric correction in the case of the change in diameter of the light spot in the cross scan-corresponding direction. Accordingly, when there is field curvature of the image forming system in the cross scan-corresponding direction, the diameter of the light spot in the cross scan-corresponding direction is changed in accordance with the height of an image.

Further, when there is a so-called inclination of a deflecting face in an optical deflector for deflecting a light beam at an equal angular velocity, the position of a main scanning line scanned by a light spot is changed in the cross scanning direction so that so-called pitch irregularities of the scanning line are caused. The diameter of the light spot is changed and the pitch irregularities are caused even when an image forming mirror is used as the image forming system.

When the image forming mirror is used, the light beam formed as an image by the image forming mirror is reflected onto the same side as a light beam incident to the image forming mirror. Therefore, it is necessary to dispose a means for separating optical paths of the incident and reflected light beams from each other. The main scanning line is curved by the separation of the optical paths. This curve in a main scanning line is a problem peculiar to usage of the image forming mirror.

SUMMARY OF THE INVENTION

It is therefore an object of the present invention to provide a novel optical scanner using an image forming mirror and effectively reducing a change in diameter of a light spot caused by field curvature.

Another object of the present invention is to provide a novel optical scanner which uses an image forming mirror and effectively reduces a change in diameter of a light spot, and effectively prevents pitch irregularities of a scanning line caused by the inclination of a deflecting face of an optical deflector from being caused.

Another object of the present invention is to provide a novel optical scanner which uses an image forming mirror and effectively reduces a change in diameter of a light spot, and effectively prevents pitch irregularities of a scanning line from being caused, and effectively corrects a curve in a main scanning line caused by separating the optical paths of light beams from each other.

To achieve the above objects of the present invention, an optical scanner having a first structure has a light source, a coupling lens, an optical deflector, an image forming mirror, an optical path separating means and an elongated cylindrical image forming element.

The light source emits a light beam for performing an optical scanning operation. The light source can be constructed by each of a semiconductor laser and a light emitting diode.

The coupling lens changes the light beam emitted from the light source to a convergent, divergent or parallel light beam.

The optical deflector deflects the light beam from the coupling lens at an equal angular velocity. The optical deflector can be constructed by a tenon type mirror, a pyramidal mirror, a rotary polygon mirror, etc.

The image forming mirror converges the deflected light beam obtained by the optical deflector onto a scanned face with respect to a main scan-corresponding direction and performs the optical scanning operation at an equal speed. A reflecting face of the image forming mirror is constructed by a coaxial aspherical surface.

The optical path separating means separates an optical path of light reflected on the image forming mirror from an optical path of incident light from the light source to the image forming mirror.

The elongated cylindrical optical element has positive refracting power only in a direction perpendicular to a longitudinal direction thereof. The elongated cylindrical optical element is arranged between the image forming mirror and the scanned face in a state in which this longitudinal direction is parallel to the main scan-corresponding direction. The elongated cylindrical optical element converges the deflected light beam onto the scanned face in a cross scan-corresponding direction in cooperation with the image forming mirror. Accordingly, the deflected light beam is converged by the image forming mirror onto the scanned face with respect to the main scan-corresponding direction. The deflected light beam is converged onto the scanned face by the image forming mirror and the elongated cylindrical optical element with respect to the cross scan-corresponding direction.

In accordance with a fifth structure of the present invention, the elongated cylindrical optical element is constructed by an elongated cylindrical mirror. In accordance with a sixth structure of the present invention, the elongated cylindrical optical element is constructed by an elongated cylindrical lens.

In accordance with a second structure of the present invention, the aspherical surface constituting the reflecting face of the image forming mirror is substantially obtained by rotating a curve represented by the following formula, $$Y^2 = 2RK - (K+1)X^2 \qquad (1)$$

around a symmetrical axis when an X-axis is set to be in conformity with the symmetrical axis and a Y-axis is perpendicular to the X-axis and passes an intersecting point of the X-axis and the reflecting face, and R designates a radius of curvature of the reflecting face at the intersecting point and K designates a conical constant in a range of $-3 \leq K \leq 4$. The aspherical surface is substantially determined by the above formula (1) for the following reasons. Namely, for example, a shape closer to that of the aspherical surface represented by the formula (1) can be realized by using the following polynomial, $$X = \Sigma D_{2N} \cdot Y^{**}2N$$

and suitably selecting coefficients $D_{2N}$ and the number of terms. In this polynomial, summation is taken from 1 to $\infty$ with respect to integer N and symbol **2N represents a power of 2N. In the second structure, the shape of the reflecting surface represented by the formula (1) substantially includes a shape close to that on a deflecting reflecting face specified by the formula (1) and substantially having the same image forming function irrespective of the representation of this shape.

In a third structure of the optical scanner, in addition to the second structure, a linear image forming element is arranged between the coupling lens and the optical deflector and forms the light beam from the coupling lens as a linear image extending in the main scan-corresponding direction in a position in the vicinity of a deflecting reflecting face of the optical deflector. An image forming system constructed by the image forming mirror and the elongated cylindrical optical element approximately sets positions of the deflecting reflecting face and the scanned face in a conjugate relation in geometrical optics with respect to the cross scan-corresponding direction.

In a fourth structure of the optical scanner, a curve in a main scanning line caused by the separation of the optical paths using the optical path separating means in the third structure is corrected by executing one or more of the following correcting means a to d, a: shifting the image forming mirror in the cross scan-corresponding direction;

b: inclining the image forming mirror by rotating this image forming mirror around an axis parallel to the main scan-corresponding direction;

c: shifting the elongated cylindrical optical element in the cross scan-corresponding direction; and d: inclining the elongated cylindrical optical element by rotating this elongated cylindrical optical element around an axis parallel to the main scan-corresponding direction.

An optical scanner having a seventh structure has a light source, a coupling lens, an optical deflector, an image forming mirror, an optical path separating means and an elongated toroidal lens. The light source, the coupling lens, the optical deflector and the image forming mirror are similar to those in the above first structure of the optical scanner.

The optical path separating means separates an optical path of light reflected on this image forming mirror from an optical path of incident light from the light source to the image forming mirror.

The elongated toroidal lens is used by corresponding a longitudinal direction thereof to a main scan-corresponding direction. Namely, a light beam is deflected by the optical deflector and is incident to the elongated toroidal lens. An incident position of the deflected light beam incident to the elongated toroidal lens is displaced in the longitudinal direction thereof in accordance with this deflection. The elongated toroidal lens converges the deflected light beam onto the scanned face in cooperation with the image forming mirror. Accordingly, the deflected light beam is converged by the image forming mirror onto the scanned face with respect to the main scan-corresponding direction. The deflected light beam is converged onto the scanned face by the image forming mirror and the elongated cylindrical optical element with respect to a cross scan-corresponding direction. The elongated toroidal lens includes a barrel type toroidal face as a concave lens face which has a radius of curvature in the cross scan-corresponding direction reduced as the barrel type toroidal face is separated from an optical axis of the elongated toroidal lens in the main scan-corresponding direction.

In the seventh structure of the optical scanner, the elongated toroidal lens is arranged between the image forming mirror and the scanned face. In this case, similar to the second structure, an aspherical surface constituting a reflecting face of the image forming mirror is substantially provided by rotating a curve represented by the above formula (1) around a symmetrical axis in the range of a conical constant K set to $-3 \leq K \leq 4$ in accordance with an eighth structure.

In a ninth structure of the optical scanner, the elongated toroidal lens is arranged between the optical deflector and the image forming mirror. In this case, the range of the conical constant K is preferably set to $1 \leq K \leq 4$ in the formula (1) substantially specifying the shape of a reflecting face of the image forming mirror in accordance with a tenth structure.

In an eleventh structure of the optical scanner, in addition to the tenth structure, a linear image forming element is arranged between the coupling lens and the optical deflector and forms the light beam from the coupling lens as a linear image extending in the main scan-corresponding direction in a position in the vicinity of a deflecting reflecting face of the optical deflector. An image forming system constructed by the image forming mirror and the elongated toroidal lens approximately sets positions of the deflecting reflecting face and the scanned face in a conjugate relation in geometrical optics with respect to the cross scan-corresponding direction.

In a twelfth structure of the optical scanner, a curve in a main scanning line caused by the separation of the optical paths using the optical path separating means in the eleventh structure is corrected by executing one or more of the following correcting means A to D, A: shifting the image forming mirror in the cross scan-corresponding direction;

B: inclining the image forming mirror by rotating this image forming mirror around an axis parallel to the main scan-corresponding direction;

C: shifting the elongated toroidal lens in the cross scan-corresponding direction; and D: inclining the elongated toroidal lens by rotating this elongated toroidal lens around an axis parallel to the main scan-corresponding direction.

As mentioned above, in the first structure of the present invention, an image forming system for converging a deflected light beam as a light spot on the scanned face is constructed by the image forming mirror having a coaxial aspherical surface and the elongated cylindrical optical element. Accordingly, field curvature of the image forming mirror in the cross scan-corresponding direction is not insufficiently corrected, but can be effectively corrected by refracting power of the elongated cylindrical optical element in the cross scan-corresponding direction, an arranging position of this elongated cylindrical optical element, etc.

In the second structure of the optical scanner, the range of a conical constant K characterizing the shape of an aspherical surface as the reflecting face of the image forming mirror is set to $-3 \leq K \leq 4$. When K is smaller than $-3$, the distance between the image forming mirror and the optical deflector is decreased so that it is difficult to provide a concrete optical arrangement. In contrast to this, when K is greater than 4. the distance between the image forming mirror and the optical deflector is increased so that it is difficult to provide a concrete optical arrangement. Further, it is difficult to preferably correct and set an optical scanning speed to be constant. Namely, it is difficult to preferably correct linearity of an image.

In the present invention, the image forming system constitutes an anamorphic optical system constructed by the image forming mirror and the elongated cylindrical optical element. Accordingly, the image forming mirror and the elongated cylindrical optical element can approximately set positions of the scanned face and the deflecting reflecting face of the optical deflector in a conjugate relation in geometrical optics with respect to the cross scan-corresponding direction. Further, in the third structure, the linear image forming element is arranged to form the light beam from a light source side as a linear image extending in the main scan-corresponding direction in the vicinity of a position of the deflecting reflecting face of the optical deflector. Thus, it is possible to correct an inclination of the deflecting reflecting face.

A curve in a main scanning line is caused since the locus of an incident position of the deflected light beam incident to the image forming mirror and the elongated cylindrical optical element is not parallel to the main scan-corresponding direction, but is curved. Therefore, this curve in the locus of the incident position can be effectively reduced by executing one or more of the above correcting means a to d in the fourth structure of the present invention.

In the seventh structure; of the present invention, the image forming system for converging the deflected light beam as a light spot on the scanned face is constructed by the image forming mirror having a coaxial aspherical surface and the elongated toroidal lens. Accordingly, field curvature of the image forming mirror in the cross scan-corresponding direction is not insufficiently corrected, but can be effectively corrected by refracting power of the elongated toroidal lens in the cross scan-corresponding direction, an arranging position of the elongated toroidal lens, etc.

When the light spot is formed by using only the image forming mirror having the coaxial aspherical surface as a reflecting face, the field curvature of the image forming mirror is generally caused in the cross scan-corresponding direction such that an image forming point in the cross scan-corresponding direction is shifted from the scanned face to a side of the optical deflector as the image forming point is separated from an optical axis of the image forming mirror. However, the elongated toroidal lens includes the above-mentioned barrel type toroidal face as a concave lens face. Therefore, positive refracting power of the elongated toroidal lens in the cross scan-corresponding direction is reduced as a face portion of the toroidal lens is separated from an optical axis thereof in the main scan-corresponding direction. An image forming position is provided by the elongated toroidal lens and the image forming mirror in the cross scan-corresponding direction such that this image forming position is moved onto a side of the scanned face as the image forming position is separated from an optical axis of each of the toroidal lens and the image forming mirror in a main scanning direction. Thus, the field curvature of the image forming mirror in the cross scan-corresponding direction is effectively corrected.

In the seventh structure of the optical scanner, the elongated toroidal lens is arranged between the image forming mirror and the scanned face. Accordingly, the field curvature of the image forming mirror in the cross scan-corresponding direction can be very effectively corrected. This field curvature can be also effectively corrected when the distance between the image forming mirror and the scanned face is long. Therefore, the image forming mirror can be located in the vicinity of the optical deflector so that the image forming mirror can be made compact.

In the eighth structure of the present invention, similar to the second structure, the range of the conical constant K characterizing the shape of an aspherical surface as the reflecting face of the image forming mirror is set to $-3 \leq K \leq 4$. When K is smaller than $-3$, it is difficult to sufficiently correct the field curvature of the image forming mirror. In contrast to this, when K is greater than 4. the distance between the image forming mirror and the scanned face is decreased so that it is difficult to concretely arrange the elongated toroidal lens between the image forming mirror and the scanned face.

In the ninth structure of the optical scanner, the elongated toroidal lens is arranged between the optical deflector and the image forming mirror. Accordingly, the distance between the elongated toroidal lens and the scanned face is increased so that the depth of an image face is increased in the cross scan-corresponding direction. Therefore, a change in diameter of a light spot in the cross scan-corresponding direction caused by a change in image height can be effectively reduced.

In the tenth structure of the optical scanner, the range of the conical constant K characterizing the shape of an aspherical surface as the reflecting face of the image forming mirror is set to $1 \leq K \leq 4$. When K is smaller than 1, the distance between the image forming mirror and the scanned face is excessively increased so that the distance between the elongated toroidal lens and the scanned face is necessarily increased. Therefore, the lateral magnification of an image formed in the cross scan-corresponding direction is increased so that an accuracy in assembly of the optical system becomes strict. In contrast to this, when K is greater than 4, the distance between the image forming mirror and the scanned face is extremely short so that no field curvature in the main scan-corresponding direction can be effectively corrected. Therefore, no change in diameter of a light spot in the main scan-corresponding direction can be sufficiently corrected electrically.

In the tenth structure of the present invention, the image forming system is constructed by an anamorphic optical system constructed by the image forming mirror and the elongated toroidal lens. Accordingly, the image forming mirror and the elongated toroidal lens can set positions of the scanned face and the deflecting reflecting face of the optical deflector in a conjugate relation in geometrical optics with respect to the cross scan-corresponding direction. Further, in the eleventh structure, the linear image forming element is arranged to form the light beam from a light source side as a linear image extending in the main scan-corresponding direction in the vicinity of a position of the deflecting reflecting face of the optical deflector. Thus, it is possible to correct an inclination of the deflecting reflecting face.

A curve in a main scanning line is caused since the locus of an incident position of the deflected light beam incident to the image forming mirror and the elongated toroidal lens is not parallel to the main scan-corresponding direction, but is curved. Therefore, this curve in the locus of the incident position can be effectively reduced by executing one or more of the above correcting means A to D in the twelfth structure of the present invention.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical scanner in the present invention will next be described in detail with reference to the accompanying drawings.

Figure 1:
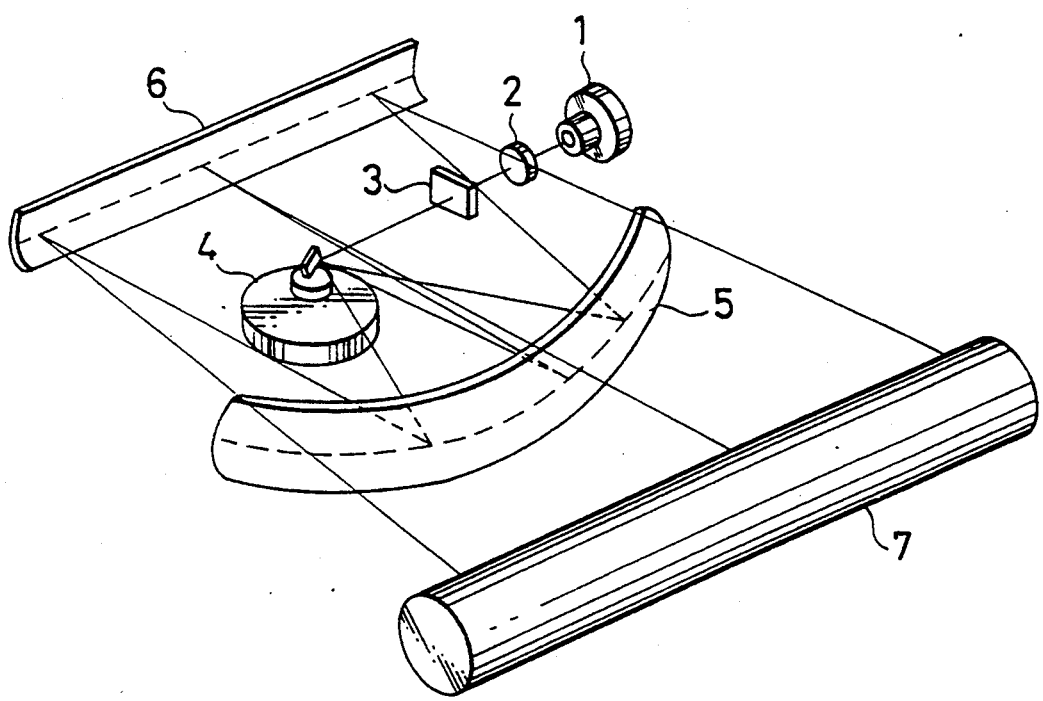
FIG. 1 is a perspective view showing one embodiment of an optical scanner having a first structure of the present invention.

In an optical scanner in accordance with an embodiment of the present invention shown in FIG. 1, a divergent light beam is transmitted through a coupling lens 2 from a semiconductor laser as a light source 1. The coupling lens 2 changes the transmitted light beam to a convergent or divergent light beam. Otherwise, the coupling lens 2 may substantially change the transmitted light beam to a parallel light beam. In this embodiment, the coupling lens 2 changes the transmitted light beam to a slightly divergent light beam.

The divergent light beam transmitted through the coupling lens 2 is then transmitted through a cylindrical lens 3 as a linear image forming element. The divergent light beam is thus converged only in a cross scan-corresponding direction and is formed as a linear image extending in a main scan-corresponding direction in the vicinity of a deflecting reflecting face of an optical deflector 4 as a tenon type mirror. The light beam reflected on the deflecting reflecting face is sequentially reflected on an image forming mirror 5 and an elongated cylindrical mirror 8. The reflected light beam is then converged as a light spot on a photoconductive photosensitive body 7 arranged such that a generating line of the photosensitive body 7 is in conformity with a main scanning line on a scanned face.

An image forming system constructed by the image forming mirror 5 and the elongated cylindrical mirror 6 forms an image as follows in each of the main scan-corresponding direction and the cross scan-corresponding direction. Namely, in the main scan-corresponding direction, an image formed by the image forming mirror 5 constitutes a light spot on the photosensitive body 7 in a state in which a divergent starting point of the light beam transmitted through the coupling lens 2 is set to an object point. The divergent starting point is a virtual divergent starting point provided when the divergent light beam subsequent to the coupling lens 2 is reversely transmitted in a state in which no coupling lens is arranged.

In contrast to this, in the cross scan-corresponding direction, an image formed by the image forming mirror 5 and the elongated cylindrical mirror 6 constitutes a light spot on the photosensitive body 7 in a state in which a linear image extending in the main scan-corresponding direction and formed by the cylindrical lens 3 is set to an object point. Namely, in the cross scan-corresponding direction, the image forming mirror 5 and the elongated cylindrical mirror 6 approximately set positions of the deflecting reflecting face and the scanned face in a conjugate relation in geometrical optics.

When the optical deflector 4 is rotated, the deflecting reflecting face is rotated so that the reflected light beam is deflected and the photosensitive body 7 is optically scanned by the light spot.

Figure 2:
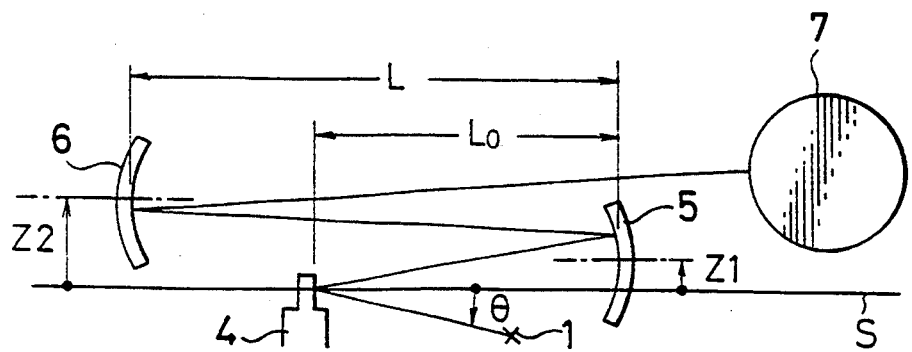
FIG. 2 is a view showing one example of an optical arrangement constituting an optical path separating means in this embodiment.

In Fig. 2, an optical path from the optical deflector 4 of the optical scanner shown in FIG. 1 to the photosensitive body 7 is seen from the main scan-corresponding direction. In FIG. 2, a vertical direction is set to the cross scan-corresponding direction. A light beam shown as a principal ray from the light source 1 is incident to the deflecting reflecting face of the optical deflector 4 at an incident angle $\theta$ with respect to the cross scan-corresponding direction. The light beam is sequentially reflected on the image forming mirror 5 and the elongated cylindrical mirror 6 and is then incident to the photosensitive body 7.

In the following description, a reference face S is set to a face passing an incident position of the light beam to the deflecting reflecting face and perpendicular to a rotational axis of the deflecting reflecting face. The image forming mirror 5 is arranged in a state in which the image forming mirror 5 is shifted by a distance Z1 upward from the reference face S in the cross scan-corresponding direction. The elongated cylindrical mirror 6 is arranged such that the cylindrical mirror 8 is shifted by a distance Z2 upward from the reference face S in the cross scan-corresponding direction. The distance Z2 is set to be longer than the distance Z1 (Z2 > Z1). An optical path separating means is constructed by shifting the image forming mirror 5 and the elongated cylindrical mirror 6 from each other in the cross scan-corresponding direction with respect to the reference face S. The optical path separating means is also constructed by setting the light beam incident to the deflecting reflecting face to be inclined an angle $\theta$ with respect to the reference face S. Namely, the distances Z1 and Z2 are set to be positive when the image forming mirror 5 and the elongated cylindrical mirror 6 are located upward from the reference face S. The incident angle $\theta$ is set to be positive in the counterclockwise direction with the reference face S as a zero incident angle. An angle $\beta$ shown in FIG. 3 is set to be positive in the counterclockwise direction.

As shown in FIG. 2, the light beam reflected on the deflecting reflecting face is incident to an incident face of the image forming mirror 5 above the position of an optical axis thereof shown by a chain line. This incident light beam is then incident to the elongated cylindrical mirror 6 below its optical axis shown by a chain line. Namely, in this embodiment, correcting means a and c in a fourth structure of the present invention are executed.

An incident direction of the incident light beam onto the deflecting reflecting face is inclined the angle $\theta$ in the cross scan-corresponding direction. Therefore, a scanning face of a principal ray of the deflected light beam is not planar, but is conical. Accordingly, an incident position of the light beam incident to the image forming mirror 5 is shifted upward in FIG. 2 as an angle of deflection of the light beam is increased. An incident position of the light beam incident to the elongated cylindrical mirror 6 is correspondingly shifted downward in FIG. 2 as the angle of deflection of the light beam is increased. A curve in a main scanning line is caused by each of the image forming mirror 5 and the elongated cylindrical mirror 6 by using the above shifts such that these curves are directed in opposite directions. Thus, these curves are canceled and are reduced to such an extent that there is no practical problem about these curves.

Figure 3:
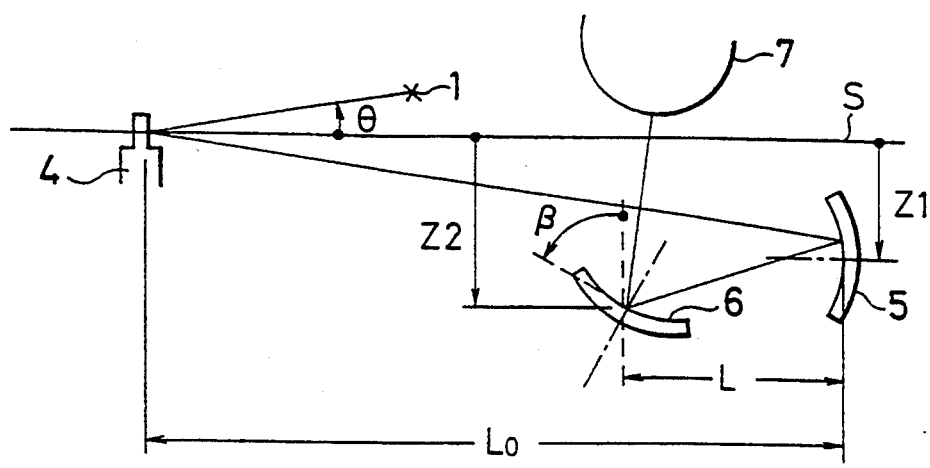
FIG. 3 is a view showing another example of the optical arrangement constituting the optical path separating means.

Similar to FIG. 2, FIG. 3 illustrates an optical arrangement showing another example of the optical path separating means. For brevity, the same kinds of constructional members as FIG. 2 are designated by the same reference numerals. In this example, in the optical path separating means, an image forming mirror 5 and an elongated cylindrical mirror 6 are shifted from a reference face S in a cross scan-corresponding direction set to a vertical direction. Further, in this optical arrangement, a reflecting face of the elongated cylindrical mirror 6 is rotated around an axis parallel to a main scan-corresponding direction perpendicular to a paper face. Further, in the optical path separating means, the direction of a light beam incident onto a deflecting reflecting face of an optical deflector 4 is set to be inclined an angle $\theta$ with respect to the cross scan-corresponding direction.

To correct a curve in a main scanning line, the position of an optical axis of the image forming mirror 5 is shifted from an incident position of the deflected light beam in the cross scan-corresponding direction. Further, the elongated cylindrical mirror 6 is rotated around an axis parallel to the main scan-corresponding direction and is inclined with respect to the reference face S. Namely, correcting means a, c and d in the fourth structure of the present invention are executed.

Three concrete examples 1, 2 and 3 of the optical arrangement shown in each of FIGS. 2 and 3 will next be explained. In each of the concrete examples, K designates a conical constant characterizing the shape of an aspherical surface constituting the reflecting face of the image forming mirror 5. R designates a radius of curvature of the image forming mirror 5 at an intersecting point of this reflecting face and a rotational symmetric axis thereof. Rc designates a radius of curvature of the elongated cylindrical mirror 6 in a direction of refracting power thereof. An angle $\theta$ designates an inclination of the light beam incident to the deflecting reflecting face with respect to the reference face S. An angle $\beta$ designates an inclination of the elongated cylindrical mirror 6 with respect to the reference face S as shown in FIG. 3. Further, reference numerals $L_0$, L, Z1 and Z2 respectively designate distances shown in FIGS. 2 and 3. An optical arrangement from the light source to the deflecting reflecting face is provided as shown in FIG. 1.

Further, reference numeral $S_0$ designates a distance from a position of the reflecting face of the image forming mirror 5 to the position of an object point on an optical axis of the image forming mirror 5. In this case, the object point is provided as an image formed by the image forming mirror 5 in the main scan-corresponding direction. When a light beam emitted from the coupling lens 2 is set to a divergent light beam, $S_0$ is shown by using the above-mentioned divergent starting point. In contrast to this, when the light beam emitted from the coupling lens 2 is set to a convergent light beam, $S_0$ is shown by using a natural convergent point of this light beam at which the convergent light beam is naturally converged on an optical path without any influence of the other optical systems on the convergent light beam. In each of the concrete examples, a writing width as an effective length of a main scanning line is set to 216 mm.

Concrete Example 1
K=−3.0, $S_0$=−72.4, $L_0$=29.4, L=100.3,
R=−106.95, Rc=−155, $\theta$=−4°, Z1=−0.46
Z2=5.6

Concrete Example 2
K=1.0, $S_0$=112.4, $L_0$=104.5, L=41.9,
R=−300, Rc=−52.7, $\theta$=1°, $\beta$=45°,
Z1=−24.4, Z2=−7.5

Concrete Example 3
K=4.0, $S_0$=69.9, $L_0$=104.9, L=27.6,
R=−363, Rc=−49, $\theta$=6°, $\beta$=29°,
Z1=−46.3, Z2=−17.5

Figure 4A:
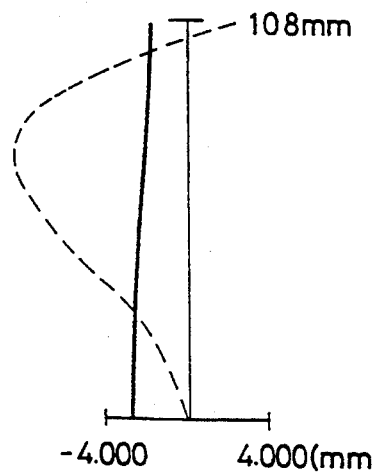
FIG. 4 is diagrams showing field curvature, $f\theta$ characteristics and a curve in a main scanning line with respect to the concrete example of the optical arrangement shown in FIG. 2.
Figure 4B:
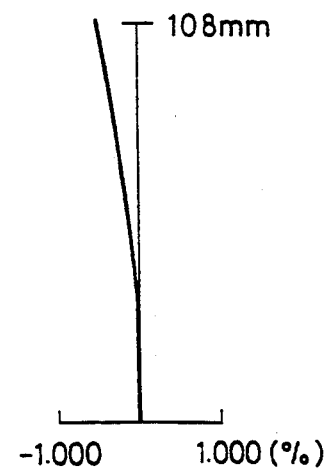
Figure 4C:
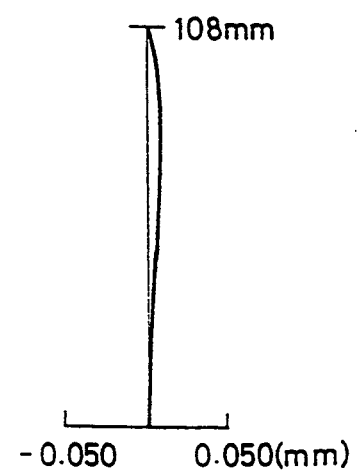
Figure 5A:
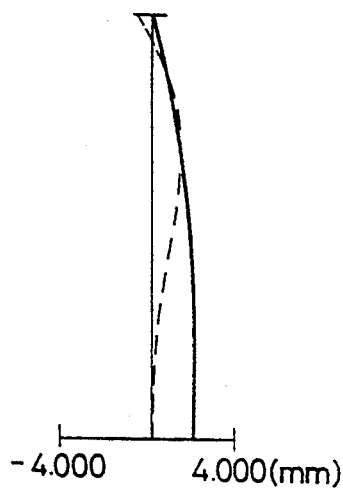
FIG. 5 is diagrams showing field curvature, $f\theta$ characteristics and a curve in a main scanning line with respect to the concrete example of the optical arrangement shown in FIG. 3.
Figure 5B:
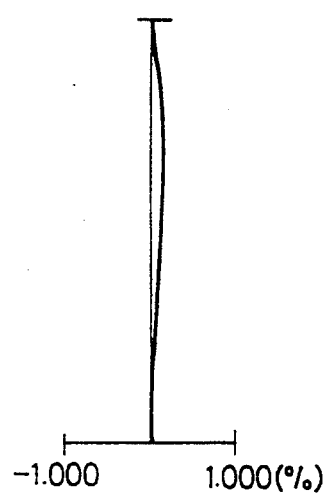
Figure 5C:
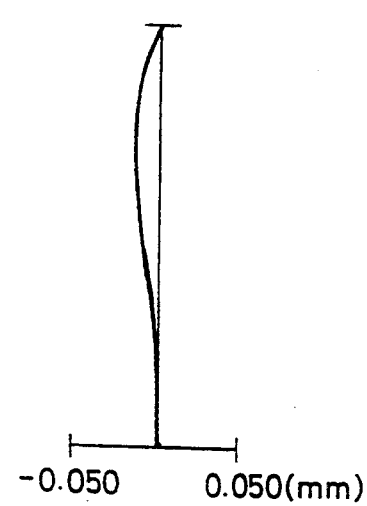
Figure 6A:
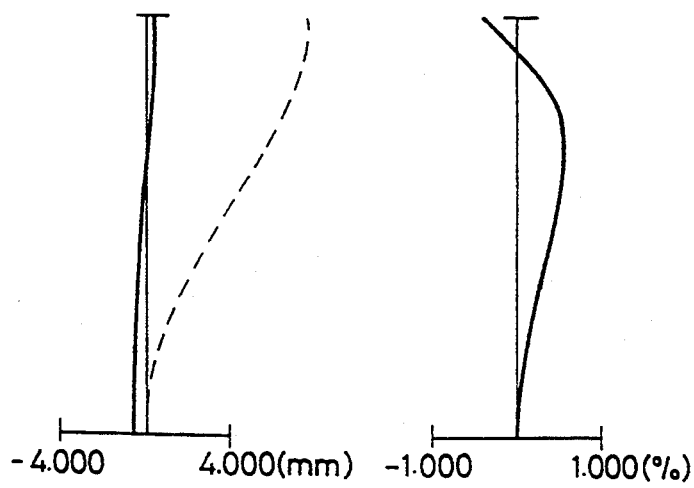
FIG. 6 is diagrams showing field curvature, $f\theta$ characteristics and a curve in a main scanning line with respect to another concrete example of the optical arrangement shown in FIG. 3.
Figure 6B:
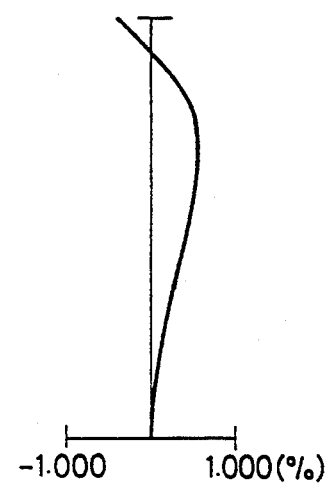
Figure 6C:
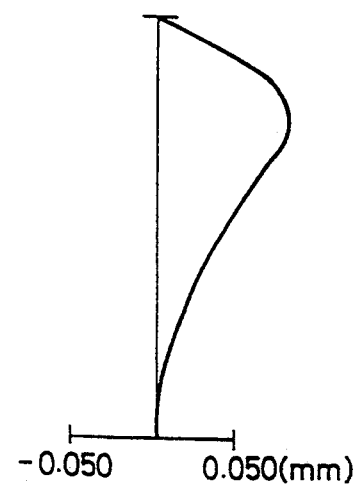

The optical arrangement in the above concrete example 1 is similar to that shown in FIG. 2. The optical arrangement in each of the concrete examples 2 and 3 is similar to that shown in FIG. 3. FIGS. 4 to 6 respectively show field curvature, scanning characteristics and a curve in a main scanning line with respect to the concrete examples 1 to 3. The field curvature is shown by a left-hand diagram of each of FIGS. 4 to 6. In this left-hand diagram, the main scan-corresponding direction is shown by a broken line and the cross scan-corresponding direction is shown by a solid line. The scanning characteristics are shown by a central diagram of each of FIGS. 4 to 6. The curve in a main scanning line is shown by a right-hand diagram of each of FIGS. 4 to 6.

The scanning characteristics correspond to $f\theta$ characteristics of an $f\theta$ lens. $H(\alpha)$ is set to an ideal image height for performing an optical scanning operation at an equal speed when an angle of deflection of a deflected light beam is set to $\alpha$ $R(\alpha)$ is set to a height of the real image, In this case, the scanning characteristics are defined by an amount represented by the following formula.

$$[\{H(\alpha) - R(\alpha)\}/H(\alpha)] \times 100(\%)$$

Figure 7:
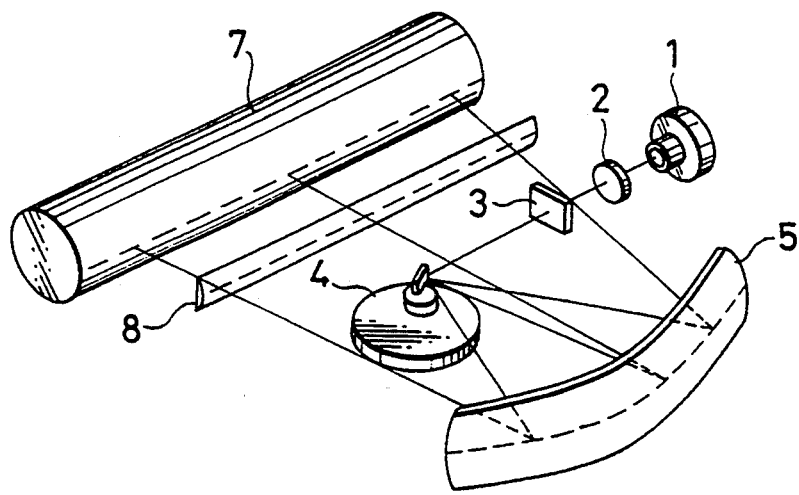
FIG. 7 is a perspective view showing another embodiment of the optical scanner of the present invention.

FIG. 7 shows an optical scanner in accordance with another embodiment of the present invention. For brevity, in Fig. 7, the same constructional portions as FIG. 1 are designated by the same reference numerals. The differences between the embodiments shown in FIGS. 1 and 7 are that an elongated cylindrical flat convex lens 8 is used as an elongated cylindrical optical element instead of the elongated cylindrical mirror 6 in FIG. 7.

Figure 8:
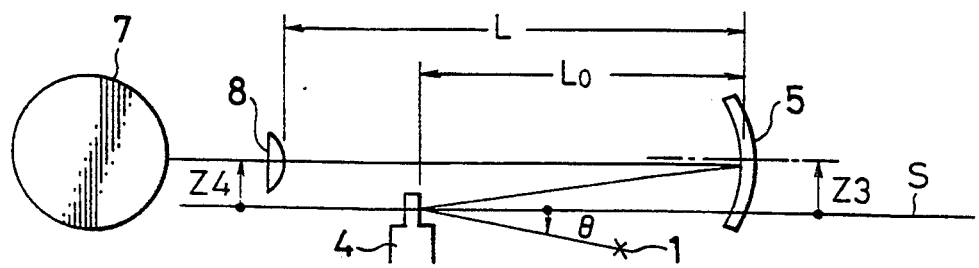
FIG. 8 is a view showing one example of an optical arrangement constituting an optical path separating means in the embodiment shown in FIG. 7.
Figure 9:
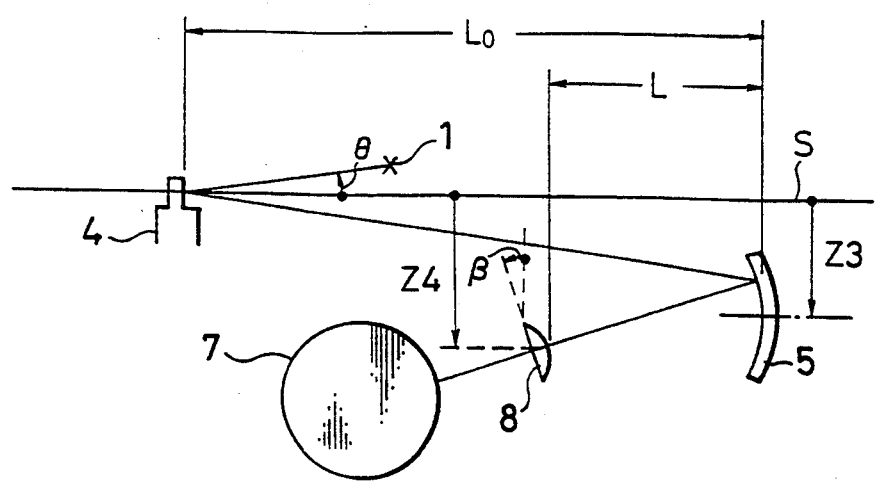
FIG. 9 is a view showing another example of the optical arrangement constituting the optical path separating means in the embodiment shown in FIG. 7.

FIGS. 8 and 9 show two examples of an optical arrangement constituting an optical path separating means in the optical scanner shown in FIG. 7, In the optical arrangement shown in FIG. 8, an image forming mirror 5 is arranged such that the image forming mirror 5 is shifted by a distance Z3 upward from a reference face S in a cross scan-corresponding direction, The elongated cylindrical lens 8 is arranged such that the elongated cylindrical lens 8 is shifted by a distance Z4 upward from the reference face S in the cross scan-corresponding direction. The optical path separating means is constructed by shifting the image forming mirror 5 and the elongated cylindrical lens 8 from each other in the cross scan-corresponding direction with respect to the reference face S. The optical path separating means is also constructed by setting a light beam incident to a deflecting reflecting face of an optical deflector 4 to be inclined an angle $\theta$ with respect to the reference face S. In this embodiment, correcting means a and c in the fourth structure of the present invention are executed.

In the optical arrangement shown in FIG. 9, an image forming mirror 5 and an elongated cylindrical lens 8 are shifted from a reference face S in a cross scan-corresponding direction set to a vertical direction in the optical path separating means. Further, in this optical arrangement, the elongated cylindrical lens 8 is rotated around an axis parallel to a main scan-corresponding direction perpendicular to a paper face. Further, in the optical path separating means, the direction of a light beam incident onto a deflecting reflecting face of an optical deflector 4 is set to be inclined an angle $\theta$ with respect to the cross scan-corresponding direction. To correct a curve in a main scanning line, the position of an optical axis of the image forming mirror 5 is shifted from an incident position of the deflected light beam in the cross scan-corresponding direction. Further, the elongated cylindrical lens 8 is rotated around an axis parallel to the main scan-corresponding direction and is inclined with respect to the reference face S. Namely, correcting means a, c and d in the fourth structure of the present invention are executed.

Three concrete examples 4, 5 and 6 of the optical arrangement shown in each of FIGS. 8 and 9 will next be explained. K, R, $\theta$ and $S_0$ are similar to those in the above concrete examples 1 to 3. Rc1 designates a radius of curvature of a convex face of the elongated cylindrical lens 8 in a direction of refracting power thereof. In this case, the elongated cylindrical lens 8 has 8 mm in thickness, 1.51118 in refractive index and 780 nm in wavelength. As shown in FIG. 9, an angle $\beta$ is set to an angle of inclination of the elongated cylindrical lens 8 with respect to the reference face S. $L_0$, L, Z3 and Z4 designate respective distances shown in FIGS. 8 and 9. An optical arrangement from a light source to the deflecting reflecting face is provided as shown in FIG. 7. In each of these concrete examples, a writing width is set to 216 mm.

Figure 10A:
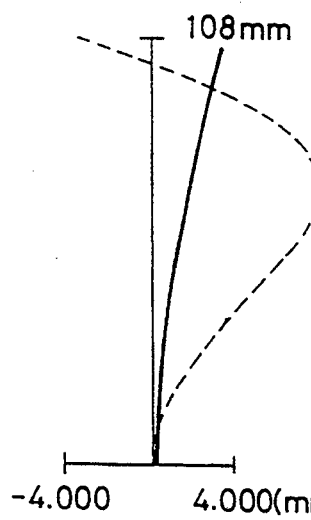
FIG. 10 is diagrams showing field curvature, $f\theta$ characteristics and a curve in a main scanning line with respect to the concrete example of the optical arrangement shown in FIG. 8.
Figure 10B:
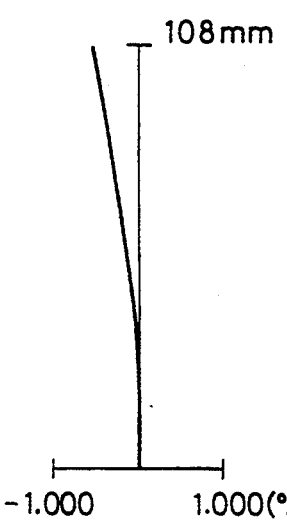
Figure 10C:
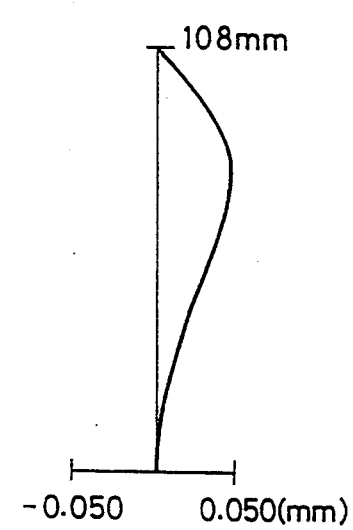
Figure 11A:
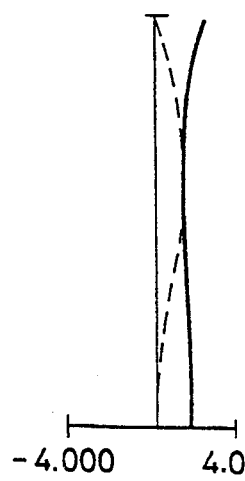
FIG. 11 is diagrams showing field curvature, $f\theta$ characteristics and a curve in a main scanning line with respect to the concrete example of the optical arrangement shown in FIG. 9.
Figure 11B:
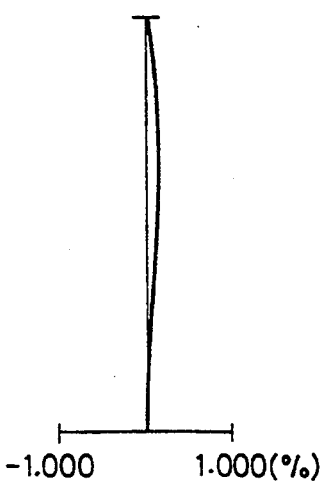
Figure 11C:
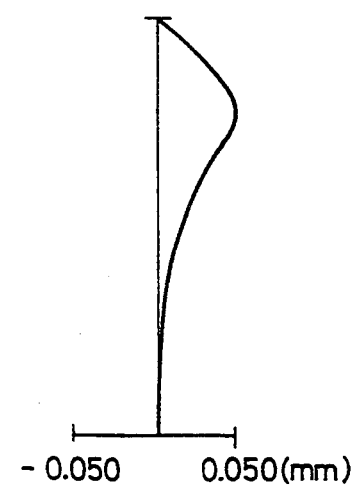
Figure 12A:
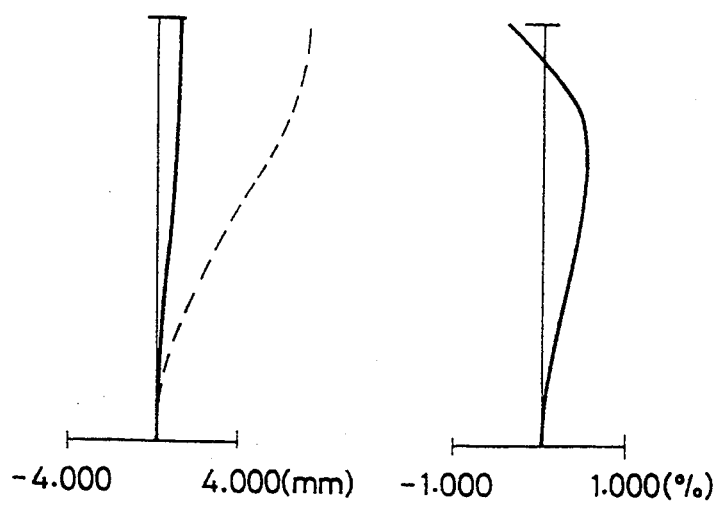
FIG. 12 is diagrams showing field curvature, $f\theta$ characteristics and a curve in a main scanning line with respect to another concrete example of the optical arrangement shown in FIG. 9.
Figure 12B:
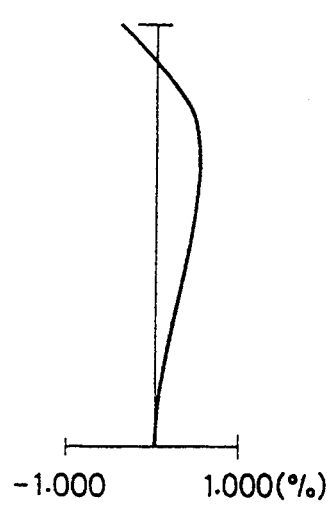
Figure 12C:
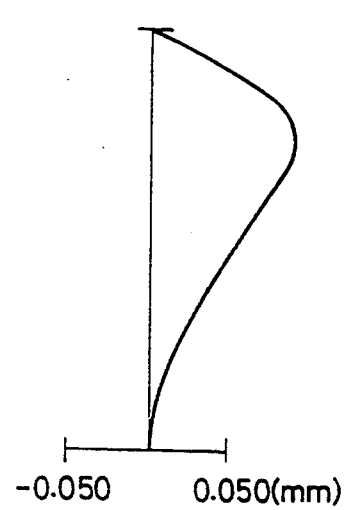

Concrete Example 4
$K=-3.0$, $S_0=-72.4$, $L_0=29.4$, $L=189.3$,
$R=-106.95$, $Rc1=14.0$, $\theta=-4°$, $\beta=0$,
$Z3=-0.46$, $Z4=7.8$ Concrete Example 5
$K=1.0$, $S_0=112.4$, $L_0=104.9$, $L=50$,
$R=-300$, $Rc1=7.18$, $\theta=6°$, $\beta=15°$,
$Z3=-44.3$, $Z4=-25.3$ Concrete Example 6
$K=4.0$, $S_0=69.9$, $L_0=104.9$, $L=30$,
$R=-363$, $Rc1=12.1$, $\theta=6°$, $\beta=0°$,
$Z3=-44.3$, $Z2=-18.3$ The optical arrangement in the above concrete example 4 is similar to that shown in FIG. 8. The optical arrangement in each of the concrete examples 5 and 6 is similar to that shown in FIG. 9. In the concrete example 6, no elongated cylindrical lens is inclined with respect to the reference face S. FIGS. 10 to 12 respectively show field curvature, scanning characteristics and a curve in a main scanning line with respect to the concrete examples 4 to 6. The field curvature is shown by a left-hand diagram of each of FIGS. 10 to 12. In this left-hand diagram, the main scan-corresponding direction is shown by a broken line and the cross scan-corresponding direction is shown by a solid line. The scanning characteristics are shown by a central diagram of each of FIGS. 10 to 12. The curve in a main scanning line is shown by a right-hand diagram of each of FIGS. 10 to 12.

The field curvature shown by a solid line in the cross scan-corresponding direction is very preferably corrected from the diagrams or the field curvature, the scanning characteristics and the curve in a main scanning line with respect to the concrete examples 1 to 6. The field curvature in the main scan-corresponding direction is large to a certain extent in some concrete examples. However, in such a case, a change in diameter of a light spot in a main scanning direction can be sufficiently corrected by electrically correcting this field curvature. In each of the concrete examples, the curve in a main scanning line is very small and the scanning characteristics are very preferable.

Figure 13A:
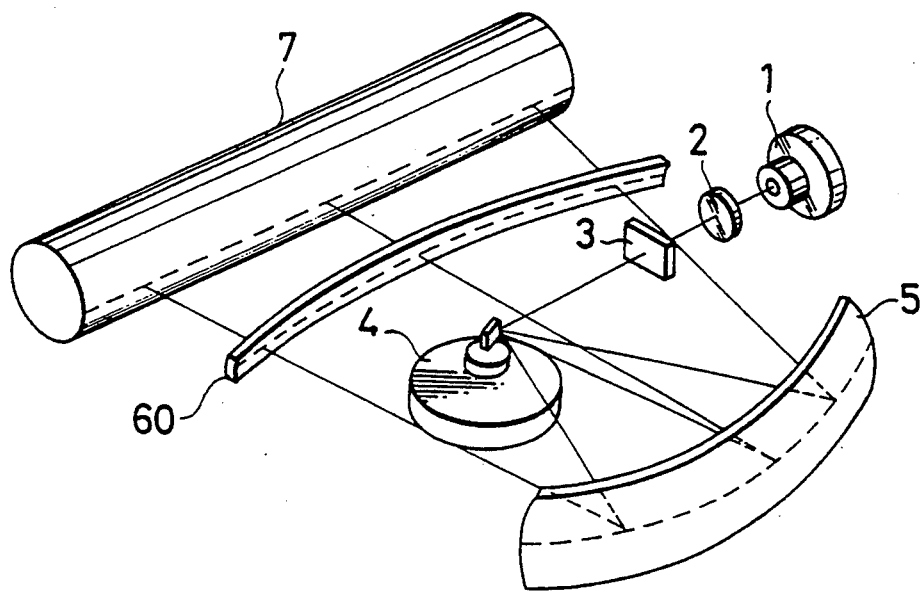
FIGS. 13a and 13b are perspective views showing one embodiment of an optical scanner having a seventh structure of the present invention.

FIG. 13a shows an embodiment of an optical scanner having each of seventh and eighth structures of the present invention. In the embodiments described later, for brevity, constructional portions similar to those in FIG. 1 are designated by the same reference numerals.

A divergent light beam is emitted from a semiconductor laser as a light source 1 and is transmitted through a coupling lens 2. The coupling lens 2 changes the transmitted light beam to a convergent or divergent light beam. Otherwise, the coupling lens 2 may substantially change the transmitted light beam to a parallel light beam. Here, similar to the above embodiments, the coupling lens 2 changes the transmitted light beam to a slightly divergent light beam.

The divergent light beam transmitted through the coupling lens 2 is then transmitted through a cylindrical lens 3 as a linear image forming element. The divergent light beam is thus converged only in a cross scan-corresponding direction and is formed as a linear image extending in a main scan-corresponding direction in the vicinity of a deflecting reflecting face of an optical deflector 4. The light beam reflected on the deflecting reflecting face is reflected on an image forming mirror 5 and is then transmitted through an elongated toroidal lens 60. The light beam is thus converged as a light spot on a photoconductive photosensitive body 7 arranged such that a generating line of the photosensitive body 7 is in conformity with a main scanning line on a scanned face.

An image forming system constructed by the image forming mirror 5 and the elongated toroidal lens 60 forms an image as follows in each of the main scan-corresponding direction and the cross scan-corresponding direction. Namely, in the main scan-corresponding direction, an image formed by the image forming mirror 5 constitutes a light spot on the photosensitive body 7 in a state in which a divergent starting point of the light beam transmitted through the coupling lens 2 is set to an object point. In contrast to this, in the cross scan-corresponding direction, an image formed by the image forming mirror 5 and the elongated toroidal lens 60 constitutes a light spot on the photosensitive body 7 in a state in which a linear image extending in the main scan-corresponding direction and formed by the cylindrical lens 3 is set, to an object point. Namely, in the cross scan-corresponding direction, the image forming mirror 5 and the elongated toroidal lens 60 approximately set positions of the deflecting reflecting face and the scanned face in a conjugate relation in geometrical optics.

When the optical deflector 4 is rotated, the deflecting reflecting face is rotated so that the reflected light beam is deflected and the photosensitive body 7 is optically scanned by the light spot.

Figure 13B:
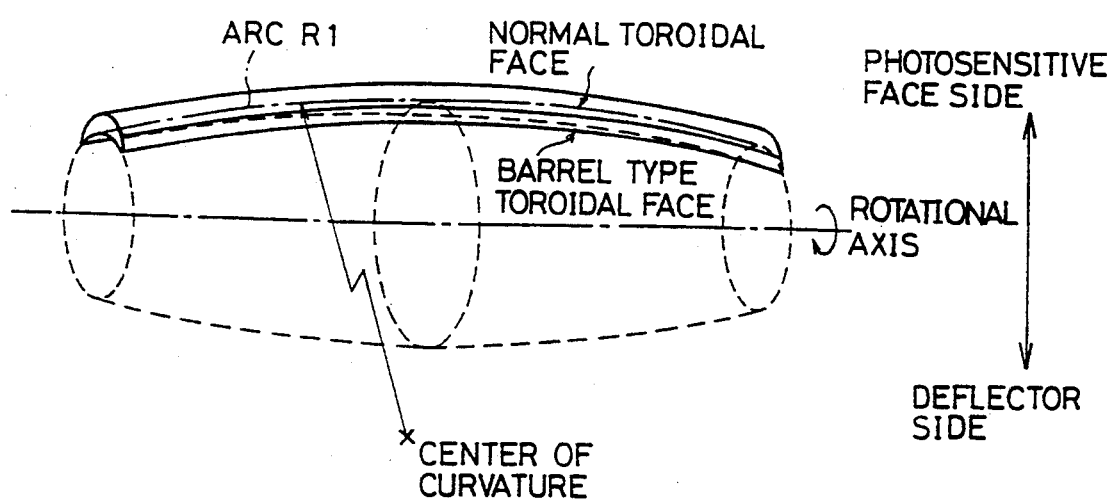

As shown in FIG. 13b, the elongated toroidal lens 60 has a normal toroidal face as a convex lens face and a barrel type toroidal face as a concave lens face. The barrel type toroidal face has a radius of curvature common to the normal toroidal face in the main scan-corresponding direction. However, in the cross scan-corresponding direction, the barrel type toroidal face has a radius of curvature set to the radius of a circle (shown by a broken line) and reduced as this toroidal face is separated from an optical axis of the toroidal lens 60 in the main scan-corresponding direction set to a horizontal direction in FIG. 13b. Thus, the barrel type toroidal face has an outside face formed in a so-called well-known barrel shape.

Figure 14:
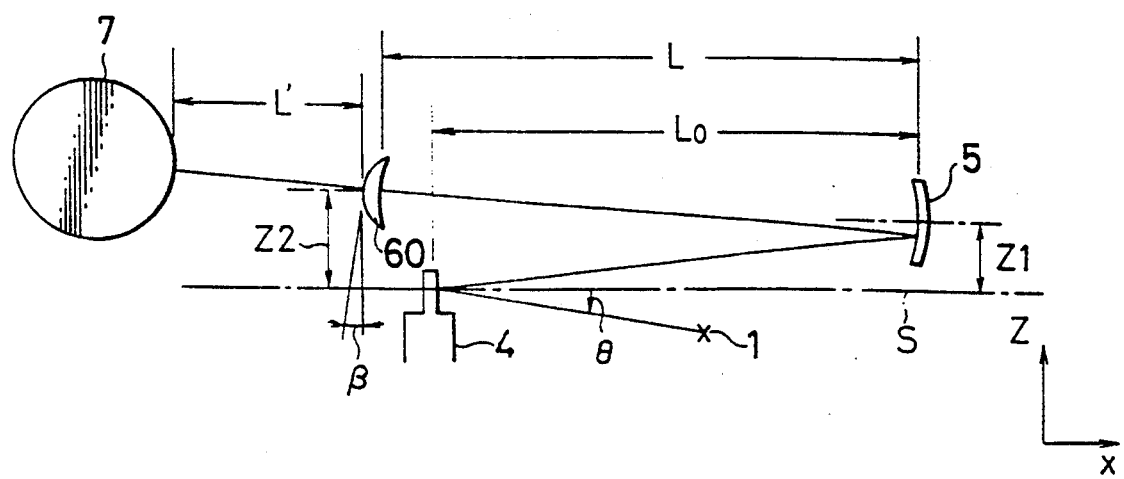
FIG. 14 is a view showing an optical arrangement constituting an optical path separating means in the embodiment shown in FIG. 13.

In FIG. 14, an optical path from the optical deflector 4 to the photosensitive body 7 in the optical scanner shown in FIG. 13a is seen in the main scan-corresponding direction. A light beam shown as a principal ray from the light source 1 is incident to the deflecting reflecting face of the optical deflector 4 at an incident angle $\theta$ inclined with respect to a reference face S. The light beam is reflected on the image forming mirror 5 and is transmitted through the elongated toroidal lens 60 to the photosensitive body 7.

The image forming mirror 5 is arranged such that the image forming mirror 5 is shifted by a distance Z1 upward from the reference face S in the cross scan-corresponding direction. The elongated toroidal lens 60 is arranged such that the toroidal lens 60 is shifted by a distance Z2 upward from the reference face S in the cross scan-corresponding direction,, The distance Z2 is set to be longer than the distance Z1 (Z2>Z1). An optical path separating means is constructed by shifting the image forming mirror 5 and the elongated toroidal lens 60 from each other in the cross scan-corresponding direction with respect to the reference face S. The optical path separating means is also constructed by setting the light beam incident to the deflecting reflecting face to be inclined an angle $\theta$ with respect to the reference face S. As shown in FIG. 14, the reflected light beam on the deflecting reflecting face is incident to an incident face of the image forming mirror 5 below the position of an optical axis thereof shown by a chain line. The direction of an optical axis of the elongated toroidal lens 60 is inclined an angle $\beta$ with respect to the reference face S. Namely, in this embodiment, correcting means A, C and D in a twelfth structure of the present invention are executed.

An incident direction of the light beam incident onto the deflecting reflecting face is inclined the angle $\theta$ with respect to the reference face S. Therefore, a scanning face of a principal ray of the deflected light beam is not planar, but is conical. Accordingly, an incident position of the light beam incident to the image forming mirror 5 is shifted upward in FIG. 14 as an angle of deflection of the light beam is increased. An incident position of the light beam incident to the elongated toroidal lens 60 is correspondingly shifted downward in FIG. 14 as the angle of deflection of the light beam is increased. A curve in a main scanning line is caused by each of the image forming mirror 5 and the elongated toroidal lens 60 by using the above shifts such that these curves are directed in opposite directions. Thus, these curves are canceled and are reduced to such an extent that there is no practical problem about these curves.

Three concrete examples 7, 8 and 9 of the optical arrangement shown in each of FIGS. 13 and 14 will next be explained. In each of these concrete examples, as mentioned above, K designates a conical constant characterizing the shape of an aspherical surface constituting the reflecting face of the image forming mirror 5. R designates a radius of curvature of the image forming mirror 5 at an intersecting point of this reflecting face and a rotational symmetric axis thereof. Further, $R_1$ and $R_2$ respectively designate radii of curvature of incident side and light emitting side lens faces of the elongated toroidal lens 60 in the main scan-corresponding direction. $r_1$ and $r_2$ respectively designate radii of curvature of these incident side and light emitting side lens faces in the cross scan-corresponding direction. $r_1$ is equal to the radius of curvature provided in the position of an optical axis of the elongated toroidal lens 60. Reference numeral d designates a thickness of the elongated toroidal lens 60 on the optical axis thereof. Reference numeral n designates a refractive index of the elongated toroidal lens 60. $L_0$, L and L' designate respective distances shown in FIG. 14. An optical arrangement from a light source to the deflecting reflecting face is provided as shown in FIG. 13a.

$S_0$ designates a distance from a position of the reflecting face of the image forming mirror 5 to the position of an object point on the optical axis of the image forming mirror 5. The object point is provided as an image formed by the image forming mirror 5 in the main scan-corresponding direction. When the light beam emitted from the coupling lens 2 is set to a divergent light beam, $S_0$ is set to be negative at a divergent starting point as mentioned above. In contrast to this, when the light beam emitted from the coupling lens 2 is set to a convergent light beam, $S_0$ is set to be positive at a natural convergent point of this light beam. In each of the concrete examples 7 to 9, a writing width as an effective length of a main scanning line is set to 216 mm.

Figures 15A, 15B:
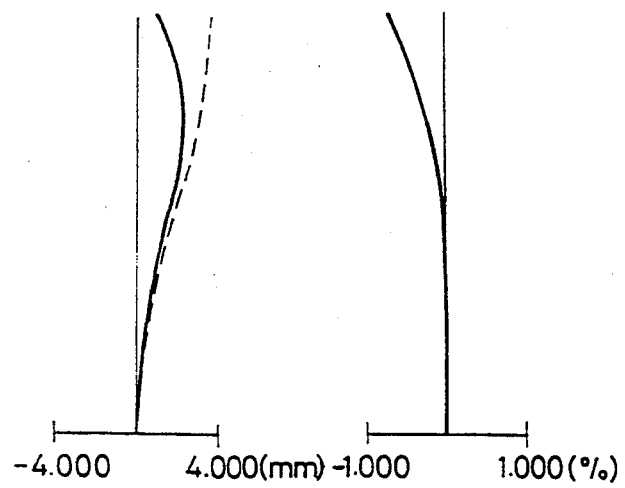
FIG. 15 is diagrams showing field curvature and scanning characteristics with respect to concrete example 7 of the optical arrangement shown in FIG. 13.
Figures 16A, 16B:
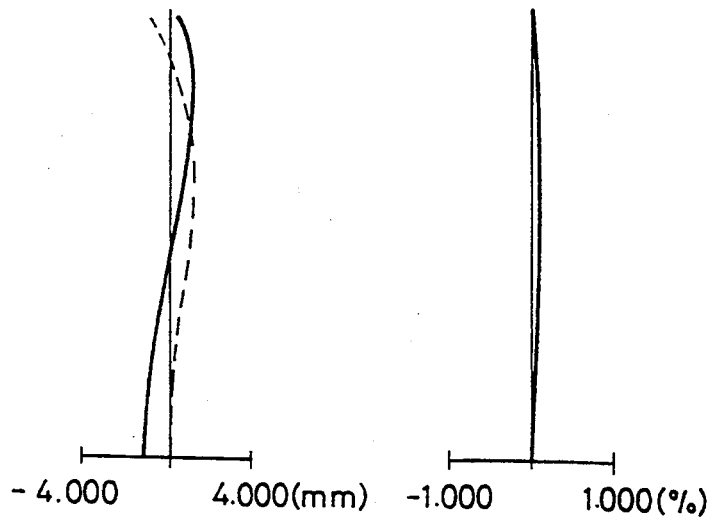
FIG. 16 is diagrams showing field curvature and scanning characteristics with respect to concrete example 8 of the optical arrangement shown in FIG. 13.
Figures 17A, 17B:
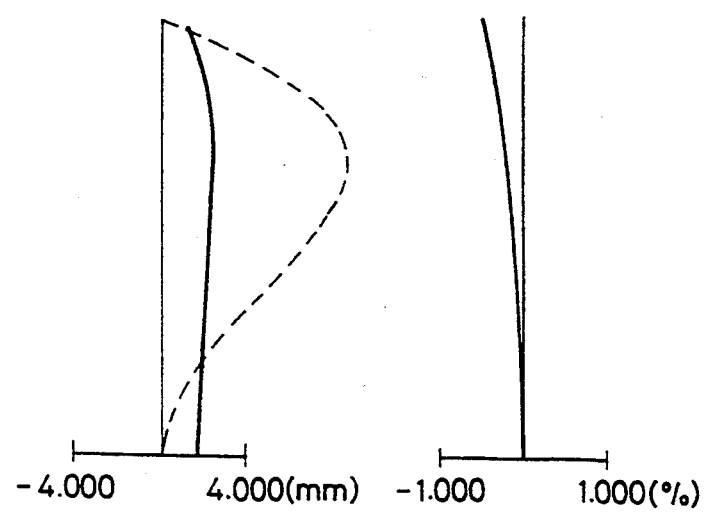
FIG. 17 is diagrams showing field curvature and scanning characteristics with respect to concrete example 9 of the optical arrangement shown in FIG. 13.

Concrete Example 7
$K=3.0$, $R=-394.4$, $S_0=85.3$, $L_0=137.7$,
$L=37.0$, $d=3.0$, $n=1.5721$, $L'=20.7$
$R_1=-700$, $R_2=-700$, $r_1=-21.0$, $r_2=-7.5$
Concrete Example 8
$K=1.0$, $R=-298.0$, $S_0=112.4$, $L_0=104.5$,
$L=38.0$, $d=3.0$, $n=1.5721$, $L'=24.3$
$R_1=-700$, $R_2=-700$, $r_1=-24.8$, $r_2=-9.0$
Concrete Example 9
$K=-3.0$, $R=-108.6$, $S_0=-72.55$, $L_0=29.55$,
$L=170.0$, $d=3.0$, $n=1.5721$, $L'=44.1$
$R_1=-700$, $R_2=-700$, $r_1=-26.0$, $r_2=-11.8$ FIGS. 15 to 17 show field curvature and scanning characteristics with respect to the concrete examples 7 to 9. The field curvature is shown in a left-hand diagram of each of FIGS. 15 to 17. In this left-hand diagram, the main scan-corresponding direction is shown by a broken line and the cross scan-corresponding direction is shown by a solid line. The scanning characteristics are shown by a right-hand diagram of each of FIGS. 15 to 17.

Figure 18:
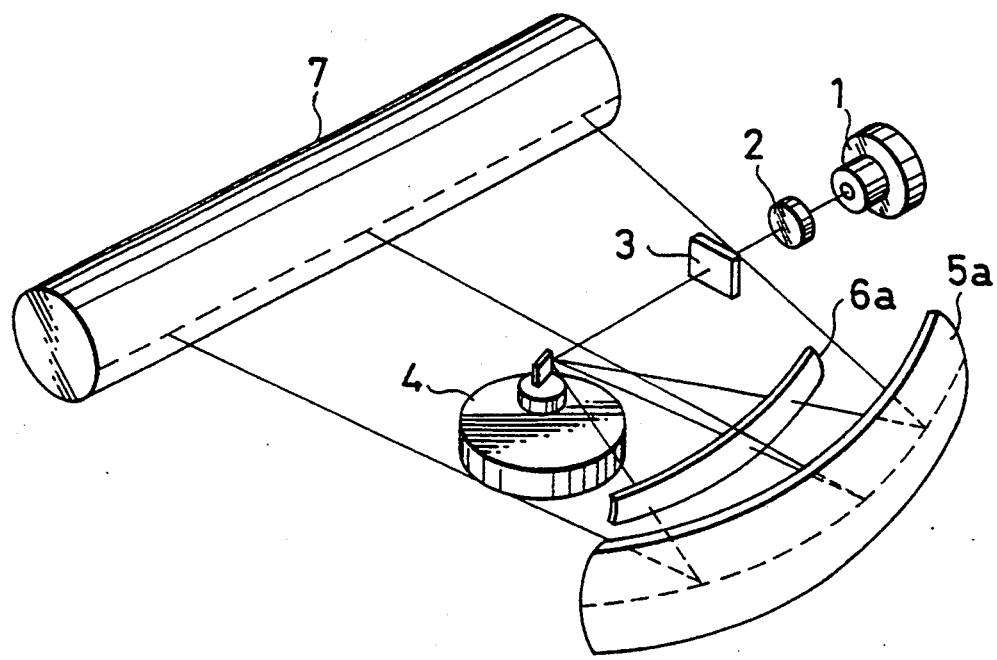
FIG. 18 is a perspective view showing one embodiment of an optical scanner having a ninth structure of the present invention.

FIG. 18 shows an embodiment of an optical scanner having each of ninth, tenth, eleventh and twelfth structures of the present invention. The differences between FIGS. 13 and 18 are that an elongated toroidal lens 6a is arranged between an optical deflector 4 and an image forming mirror 5a in this embodiment. Similar to the embodiment shown in FIG. 13, in an optical path separating means, the incident angle of a light beam incident to the optical deflector 4 is inclined with respect to the above reference face and the image forming mirror 5a and the elongated toroidal lens 6a are shifted from the reference face. A curve in a main scanning line is corrected by executing one or more of the above correcting means A to D.

Three concrete examples 10, 11 and 12 of the optical arrangement shown in FIG. 18 will next be described. In these examples, K, R, $S_0$, $R_1$, $R_2$, $r_1$, $r_2$, d and n are similar to those in the above concrete examples 7 to 9. $L_0'$ designates a distance between a starting point of deflection in the optical deflector 4 and the elongated toroidal lens 6a. L' designates a distance between the elongated toroidal lens 6a and the image forming mirror 5a. L" designates a distance from the image forming mirror 5a to a photosensitive body 7. An optical arrangement from a light source to a deflecting reflecting face of an optical deflector 4 is provided as shown in FIG. 18. In each of these concrete examples, a writing width is set to 216 mm.

Figure 19A:
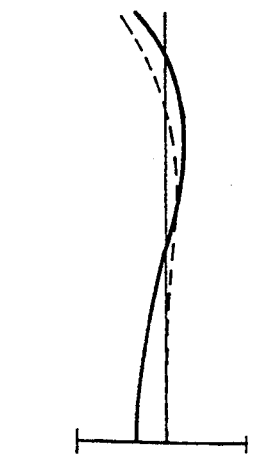
FIG. 19 is diagrams showing field curvature and scanning characteristics with respect to concrete example 10 of an optical arrangement of the optical scanner shown in FIG. 18.
Figure 19B:
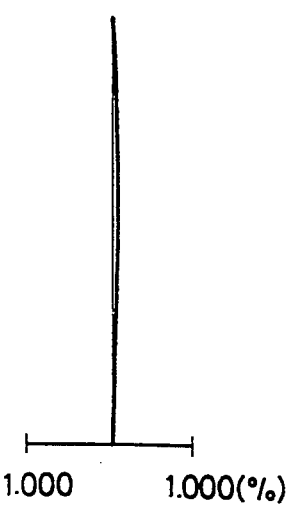
Figures 20A, 20B:
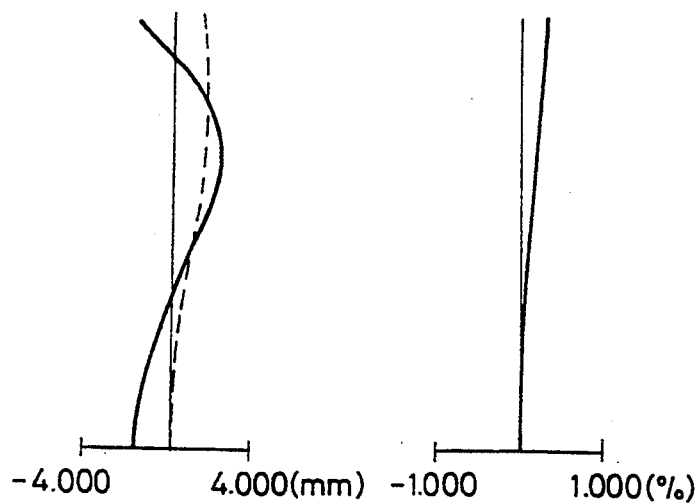
FIG. 20 is diagrams showing field curvature and scanning characteristics with respect to concrete example 11 of the optical arrangement shown in FIG. 18.
Figures 21A, 21B:
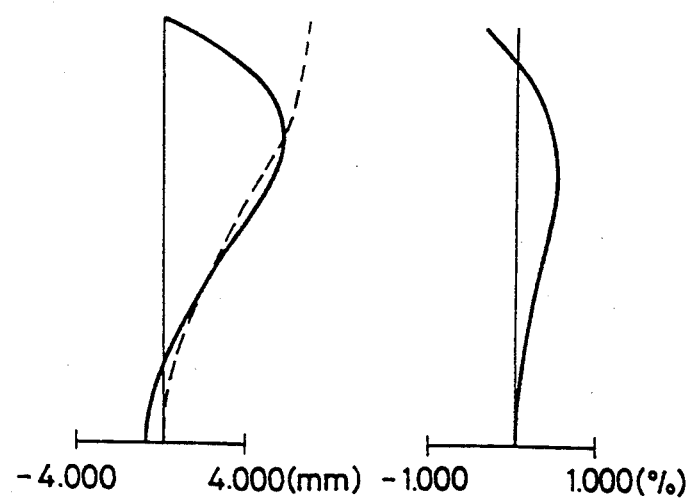
FIG. 21 is diagrams showing field curvature and scanning characteristics with respect to concrete example 12 of the optical arrangement shown in FIG. 18.

Concrete Example 10
$K=1.0$, $R=-298.5$, $S_0=112.4$, $L_0'=61.5$,
$d=3.0$, $n=1.5721$, $L'=40.0$, $L''=64.1$,
$R_1=-120$, $R_2=-120$, $r_1=-65.0$, $r_2=-20.1$
Concrete Example 11
$K=2.14$, $R=-387.6$, $S_0=82.6$, $L_0'=81.0$,
$d=3.0$, $n=1.5721$, $L'=53.7$, $L''=56.7$,
$R_1=-400$, $R_2=-400$, $r_1=-35.0$, $r_2=-16.7$
Concrete Example 12
$K=4.0$, $R=-363.0$, $S_0=69.9$, $L_0'=74.9$,
$d=3.0$, $n=1.5721$, $L'=27.0$, $L''=52.4$,
$R_1=-400$, $R_2=-400$, $r_1=-39.0$, $r_2=-15.7$ FIGS. 19 to 21 show field curvature and scanning characteristics with respect to the concrete examples 10 to 12. The field curvature is shown in a left-hand diagram of each of FIGS. 19 to 21. In this left-hand diagram, the main scan-corresponding direction is shown by a broken line and the cross scan-corresponding direction is shown by a solid line. The scanning characteristics are shown in a right-hand diagram of each of FIGS. 19 to 21.

Figure 22:
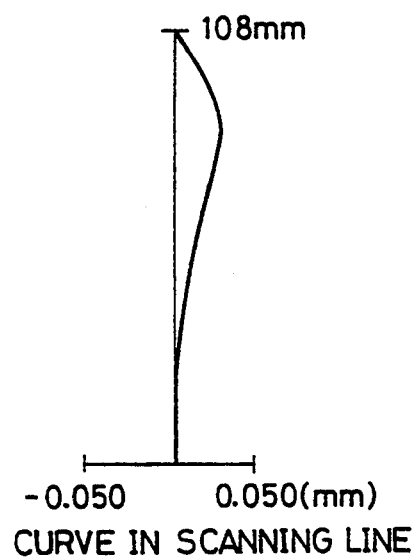
FIG. 22 is a diagram showing a curve in a main scanning line when this curve is corrected in concrete example 9 of the optical arrangement shown in FIG. 13.

In the above concrete examples 7 to 12, there is no description about the correction of a curve in a main scanning line. However, this correction of the curve in a main scanning line is optimized by using one or more of correcting means A to D in the twelfth structure. For example, in the above concrete example 9, Z1, Z2, $\theta$ and $\beta$ in FIG. 14 are respectively set to 2.8, 15.8, $-4$ degrees, and $-2.6$ degrees in an optimum case. The curve in a main scanning line obtained in this optimum case is shown in FIG. 22.

The field curvature in the cross scan-corresponding direction is very preferably corrected from the diagrams of the field curvature and the scanning characteristics with respect to the concrete examples 7 to 12. The field curvature in the main scan-corresponding direction is large to a certain extent in some concrete examples. However, in such a case, a change in diameter of a light spot in a main scanning direction can be sufficiently corrected by electrically correcting this field curvature. In each of the concrete examples, the curve in a main scanning line can be optimized to a certain extent that there is substantially no problem about this curve.

As mentioned above, in a novel optical scanner having a first structure of the present invention, an image forming system for converging a deflected light beam as a light spot on a scanned face is constructed by an image forming mirror and an elongated cylindrical optical element. Accordingly, field curvature can be preferably corrected especially in a cross scan-corresponding direction. In an optical scanner having a second structure, a reflecting face of the image forming mirror is constructed by a coaxial aspherical surface so that aberrations can be preferably corrected. In an optical scanner having a third structure, the inclination of a deflecting reflecting face can be automatically corrected. In an optical scanner having a fourth structure, a curve in a main scanning line caused by separating optical paths from each other can be corrected to such an extent that there is no practical problem about this curve.

In an optical scanner having each of seventh and ninth structures, an image forming system for converging a deflected light beam as a light spot on a scanned face is constructed by an image forming mirror and an elongated toroidal lens having a barrel type toroidal face as a concave lens face. Accordingly, field curvature can be preferably corrected especially in a cross scan-corresponding direction. In an optical scanner having each of eighth and tenth structures, a reflecting face of the image forming mirror is constructed by a coaxial aspherical surface so that aberrations can be preferably corrected. In an optical scanner having an eleventh structure, the inclination of a deflecting reflecting face can be automatically corrected. In an optical scanner having a twelfth structure, a curve in a main scanning line caused by separating optical paths from each other can be corrected to such an extent that there is no practical problem about this curve.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:
    a light source for emitting a light beam for performing an optical scanning operation;
    a coupling lens for changing this light beam from the light source to a convergent, divergent or parallel light beam;
    an optical deflector for deflecting the light beam from the coupling lens at an equal angular velocity;
    an image forming mirror for converging the deflected light beam obtained by this optical deflector onto a scanned face; with respect to a main scan-corresponding direction, and performing the optical scanning operation at an equal speed;
    optical path separating means for separating an optical path of light reflected on this image forming mirror from an optical path of incident light from said light source to the image forming mirror; and
    an elongated cylindrical optical element having positive refracting power only in a direction perpendicular to a longitudinal direction thereof and arranged between said image forming mirror and the scanned face in a state in which this longitudinal direction is parallel to the main scan-corresponding direction;
    the elongated cylindrical optical element converging said deflected light beam onto said scanned face in a cross scan-corresponding direction in cooperation with said image forming mirror; and
    a reflecting face of said image forming mirror being constructed by a coaxial aspherical surface.

2. An optical scanner as claimed in claim 1, wherein the aspherical surface constituting the reflecting face of the image forming mirror is substantially obtained by rotating a curve represented by, the following formula, $$Y^2 = 2RK - (K+1)X^2$$

around a symmetrical axis when an X-axis is set to be in conformity with the symmetrical axis and a Y-axis is perpendicular to the X-axis and passes an intersecting point of the X-axis and the reflecting face, and R designates a radius of curvature of the reflecting face at said intersecting point and K designates a conical constant in a range of $-3 \leq K \leq 4$.

3. An optical scanner as claimed in claim 2, wherein a linear image forming element is arranged between the coupling lens and the optical deflector and forms the light beam from the coupling lens as a linear image extending in the main scan-corresponding direction in a position in the vicinity of a deflecting reflecting face of the optical deflector; and
    the image forming mirror and the elongated cylindrical optical element approximately set positions of said deflecting reflecting face and the scanned face in a conjugate relation in geometrical optics with respect to the cross scan-corresponding direction.

4. An optical scanner as claimed in claim 3, wherein a curve in a main scanning line caused by the separation of the optical paths using the optical path separating means is corrected by executing one or more of the following correcting means a to d,
    a: shifting the image forming mirror in the cross scan-corresponding direction;
    b: inclining the image forming mirror by rotating this image forming mirror around an axis parallel to the main scan-corresponding direction;
    c: shifting the elongated cylindrical optical element in the cross scan-corresponding direction; and
    d: inclining the elongated cylindrical optical element by rotating this elongated cylindrical optical element around an axis parallel to the main scan-corresponding direction.

5. An optical scanner as claimed in claim 4, wherein the elongated cylindrical optical element is constructed by an elongated cylindrical mirror.

6. An optical scanner as claimed in claim 4, wherein the elongated cylindrical optical element is constructed by an elongated cylindrical lens.

7. An optical scanner comprising:
a light source for emitting a light beam for performing an optical scanning operation;
a coupling lens for changing this light beam from the light source to a convergent, divergent or parallel light beam;
an optical deflector for deflecting the light beam from the coupling lens at an equal angular velocity;
an image forming mirror for converging the deflected light beam obtained by this optical deflector onto a scanned face with respect to a main scan-corresponding direction, and performing the optical scanning operation at an equal speed;
optical path separating means for separating an optical path of light reflected on this image forming mirror from an optical path of incident light from said light source to the image forming mirror; and
an elongated toroidal lens arranged between said image forming mirror and the scanned face such that a longitudinal direction of the elongated toroidal lens corresponds to the main scan-corresponding direction;
the elongated toroidal lens converging said deflected light beam onto said scanned face in cooperation with said image forming mirror;
a reflecting face of said image forming mirror being constructed by a coaxial aspherical surface; and
said elongated toroidal lens including a barrel type toroidal face as a concave lens face which has a radius of curvature in the cross scan-corresponding direction reduced as the barrel type toroidal face is separated from an optical axis of the elongated toroidal lens in the main scan-corresponding direction.

8. An optical scanner as claimed in claim 7, wherein the aspherical surface constituting the reflecting face of the image forming mirror is substantially obtained by rotating a curve represented by the following formula, $$Y^2 = 2RK - (K+1)X^2$$

around a symmetrical axis when an X-axis is set to be in conformity with the symmetrical axis and a Y-axis is perpendicular to the X-axis and passes an intersecting point of the X-axis and the reflecting face, and R designates a radius of curvature of the reflecting face at said intersecting point and K designates a conical constant in a range of $-3 \leq K \leq 4$.

9. An optical scanner comprising:
a light source for emitting a light beam for performing an optical scanning operation;
a coupling lens for changing this light beam from the light source to a convergent, divergent or parallel light beam;
an optical deflector for deflecting the light beam from the coupling lens at an equal angular velocity;
an image forming mirror for converging the deflected light beam obtained by this optical deflector onto a scanned face with respect to a main scan-corresponding direction, and performing the optical scanning operation at an equal speed;
optical path separating means for separating an optical path of light reflected on this image forming mirror from an optical path of incident light from said light source to the image forming mirror; and
an elongated toroidal lens arranged between said optical deflector and the image forming mirror such that a longitudinal direction of the elongated toroidal lens correspons to the main scan-corresponding direction;
the elongated toroidal lens converging said deflected light beam onto said scanned face in cooperation with said image forming mirror;
a reflecting face of said image forming mirror being constructed by a coaxial aspherical surface; and
said elongated toroidal lens including a barrel type toroidal face as a concave lens face which has a radius of curvature in the cross scan-corresponding direction reduced as the barrel type toroidal face is separated from an optical axis of the elongated toroidal lens in the main scan-corresponding direction.

10. An optical scanner as claimed in claim 9, wherein the aspherical surface constituting the reflecting face of the image forming mirror is substantially obtained by rotating a curve represented by the following formula, $$Y^2 = 2RK - (K+1)X^2$$

around a symmetrical axis when an X-axis is set to be in conformity with the symmetrical axis and a Y-axis is perpendicular to the X-axis and passes an intersecting point of the X-axis and the reflecting face, and R designates a radius of curvature of the reflecting face at said intersecting point and K designates a conical constant in a range of $1 \leq K \leq 4$.

11. An optical scanner as claimed in claim 10, wherein a linear image forming element is arranged between the coupling lens and the optical deflector and forms the light beam from the coupling lens as a linear image extending in the main scan-corresponding direction in a position in the vicinity of a deflecting reflecting face of the optical deflector; and
the image forming mirror and the elongated toroidal lens approximately set positions of said deflecting reflecting face and the scanned face in a conjugate relation in geometrical optics with respect to the cross scan-corresponding direction.

12. An optical scanner as claimed in claim 11, wherein a curve in a main scanning line caused by the separation of the optical paths using the optical path separating means is corrected by executing one or more of the following correcting means A to D, A: shifting the image forming mirror in the cross scan-corresponding direction;
B: inclining the image forming mirror by rotating this image forming mirror around an axis parallel to the main scan-corresponding direction;
C: shifting the elongated toroidal lens in the cross scan-corresponding direction; and
D: inclining the elongated toroidal lens by rotating this elongated toroidal lens around an axis parallel to the main scan-corresponding direction.

* * * * *